(12) United States Patent
Oliver

(10) Patent No.: US 11,897,579 B2
(45) Date of Patent: Feb. 13, 2024

(54) JET SLED

(71) Applicant: JETTS, LLC, Cedar Falls, IA (US)

(72) Inventor: Eric Oliver, Fayetteville, AR (US)

(73) Assignee: JETTS, LLC, Cedar Falls, IA (US)

( * ) Notice: Subject to any disclaimer, the term of this patent is extended or adjusted under 35 U.S.C. 154(b) by 0 days.

(21) Appl. No.: 17/932,957

(22) Filed: Sep. 16, 2022

(65) Prior Publication Data

US 2023/0009086 A1 Jan. 12, 2023

Related U.S. Application Data

(63) Continuation of application No. 17/480,006, filed on Sep. 20, 2021, now Pat. No. 11,485,451.

(60) Provisional application No. 63/145,399, filed on Feb. 3, 2021.

(51) Int. Cl.
| | |
|---|---|
| *B62M 27/02* | (2006.01) |
| *B62B 13/14* | (2006.01) |
| *B62D 57/04* | (2006.01) |
| *B60F 3/00* | (2006.01) |
| *B60F 5/00* | (2006.01) |

(52) U.S. Cl.
CPC ....... *B62M 27/02* (2013.01); *B62M 2027/023* (2013.01); *B62M 2027/025* (2013.01)

(58) Field of Classification Search
CPC .............. B62M 27/00; B62M 27/02; B62M 2027/022; B62M 2027/023; B62M 2027/025; B62M 2027/028; B62B 13/06; B62B 13/08; B62B 13/14; B62B 13/18; B62B 17/08; B62B 19/04; A63C 5/08; B62D 57/04; B60K 2005/003; B60K 2005/006; B60F 3/0076; B60F 5/00; B60F 5/003; B63H 25/44

USPC .................. 180/7.3, 7.4, 182, 183; 440/12.5
See application file for complete search history.

(56) References Cited

U.S. PATENT DOCUMENTS

| | | |
|---|---|---|
| 1,195,149 A | 8/1916 | Ollard |
| 1,244,460 A | 10/1917 | Blaszczyk |
| 1,329,047 A | 1/1920 | Hammerstrom |

(Continued)

FOREIGN PATENT DOCUMENTS

| | | |
|---|---|---|
| FR | 2885868 A1 | 11/2006 |
| JP | 2002193187 A | 7/2001 |

(Continued)

OTHER PUBLICATIONS https://sledmagazine.com/actions/page?docId=6305&ctx=ctx&p=Ice%20jet%20Concept%20.%20a%20cool%20futuristic%20ice%20travelling%20vehicle%20,%20snowmobile%20on%20ice%20?&request_locale=en.

(Continued)

*Primary Examiner* — Anne Marie M Boehler
(74) *Attorney, Agent, or Firm* — McKee, Voorhees & Sease, PLC

(57) ABSTRACT

A jet-powered sled has a body having a control cockpit with control apparatus for an operator to control the jet sled, a set of surface runners adapted to engage a surface upon which the sled is operated, the surface runners removably engaged to spindles coupled to swing arms coupled to the jet sled, and an engine compartment having a jet engine removably mounted in a manner to direct thrust to a rear of the jet sled to propel the jet sled. The jet sled is characterized in that the sled may be adapted specifically to run on water, ice, or snow by installing runners adapted for water, ice, or snow on the spindles of the swing arms.

18 Claims, 14 Drawing Sheets

(56) References Cited

U.S. PATENT DOCUMENTS

| | | | | |
|---|---|---|---|---|
| 1,568,493 | A | * | 1/1926 | Allen .................... B62B 13/00 280/18 |
| 1,799,455 | A | | 4/1931 | Cavert |
| 2,153,234 | A | | 4/1939 | Buccella |
| 2,238,464 | A | * | 4/1941 | Fletcher ................ B63C 13/00 114/39.28 |
| 2,340,558 | A | * | 2/1944 | Porter ................... B62B 13/18 180/182 |
| 2,905,479 | A | | 9/1959 | Schomers |
| 2,994,290 | A | | 8/1961 | Merchant, Sr. |
| 3,044,566 | A | | 7/1962 | Mayr |
| 3,232,261 | A | | 1/1966 | Graig |
| 3,480,289 | A | | 11/1969 | Larkin |
| 3,511,454 | A | | 5/1970 | Hamilton |
| 3,669,212 | A | * | 6/1972 | Desbarats ............. B60V 1/046 180/120 |
| 3,785,330 | A | | 1/1974 | Fox |
| 3,799,565 | A | * | 3/1974 | Burtis .................... B62M 29/00 280/282 |
| 3,841,649 | A | | 10/1974 | McMullen |
| 3,853,194 | A | | 12/1974 | Peterson |
| 4,152,007 | A | | 5/1979 | Smith |
| 4,219,214 | A | | 8/1980 | Kostov |
| 4,230,198 | A | * | 10/1980 | Eickmann ............. B62D 57/04 440/37 |
| 4,256,319 | A | * | 3/1981 | Winter .................. B62B 15/00 280/18 |
| 4,260,036 | A | | 4/1981 | Bissett |
| 4,320,905 | A | | 3/1982 | Andrew et al. |
| 5,092,260 | A | | 3/1992 | Mardikian |
| 5,209,683 | A | | 5/1993 | Imaeda et al. |
| 5,503,242 | A | | 4/1996 | Jeffers |
| 5,509,683 | A | | 4/1996 | Daniel |
| 5,673,772 | A | | 10/1997 | Martin |
| 5,769,021 | A | * | 6/1998 | Schad ................... B60F 3/003 440/37 |
| 6,116,622 | A | | 9/2000 | Gibbons |
| 6,283,254 | B1 | | 9/2001 | Bibollet |
| 6,332,816 | B1 | | 12/2001 | Tsuchiya et al. |
| 6,691,634 | B2 | | 2/2004 | Fritchie |
| 6,695,654 | B2 | | 2/2004 | Simner |
| 6,905,128 | B1 | | 6/2005 | Lear et al. |
| 6,912,967 | B1 | | 7/2005 | Dats et al. |
| 7,007,621 | B1 | | 3/2006 | Bootes |
| 7,059,623 | B1 | | 6/2006 | Yeh |
| 7,383,907 | B2 | * | 6/2008 | Talanov ................. B60V 1/14 180/117 |
| 7,549,650 | B2 | | 6/2009 | Haire et al. |
| 7,644,787 | B2 | | 1/2010 | Phelan |
| 7,900,460 | B2 | | 3/2011 | Harefors |
| 8,316,787 | B2 | | 11/2012 | Back |
| 8,425,269 | B2 | | 4/2013 | Walkowiak |
| 9,457,885 | B2 | | 10/2016 | Guglielmo et al. |
| 10,322,614 | B1 | | 6/2019 | Naneng et al. |
| 11,485,451 | B2 | * | 11/2022 | Oliver .................... B60T 1/14 |
| 2003/0034190 | A1 | | 2/2003 | Henderson |
| 2003/0141682 | A1 | * | 7/2003 | Comden ............... B62B 13/04 280/14.28 |
| 2003/0217680 | A1 | | 11/2003 | Fritchie |
| 2004/0051262 | A1 | | 3/2004 | Young |
| 2006/0073745 | A1 | * | 4/2006 | Ficht .................... B62B 13/06 440/37 |
| 2006/0181037 | A1 | | 8/2006 | Stevens |
| 2011/0092113 | A1 | | 4/2011 | Mataya |
| 2011/0203858 | A1 | * | 8/2011 | Chanel ................. B62D 37/02 180/65.21 |
| 2014/0335355 | A1 | | 11/2014 | Ettin et al. |
| 2016/0167470 | A1 | * | 6/2016 | Seydoux ............... B63H 7/02 244/2 |
| 2016/0176255 | A1 | * | 6/2016 | Guiboche .............. B62B 13/18 114/61.24 |
| 2020/0129562 | A1 | | 4/2020 | Koob et al. |

FOREIGN PATENT DOCUMENTS

| | | | |
|---|---|---|---|
| JP | 2011102058 A | | 5/2011 |
| JP | 6345221 B2 | | 6/2018 |
| SU | 1087399 | * | 4/1984 ............ B62D 57/04 |
| WO | 2010049780 A1 | | 5/2010 |
| WO | 2014188183 A1 | | 11/2014 |

OTHER PUBLICATIONS https://svarthaletracing.se/.

Tarrant, "Jet Sled? Yes, a Swedish Bonnerville Jet Sled!", https://www.snowmobile.com/features/jet-sled-yes-a-swedish-bonnerville-jet-sled, entire document especially Figs on p. 1,6; p. 1 in 1-3, p. 2 in 21, p. 3 in 10-13, Nov. 1, 2017.

* cited by examiner

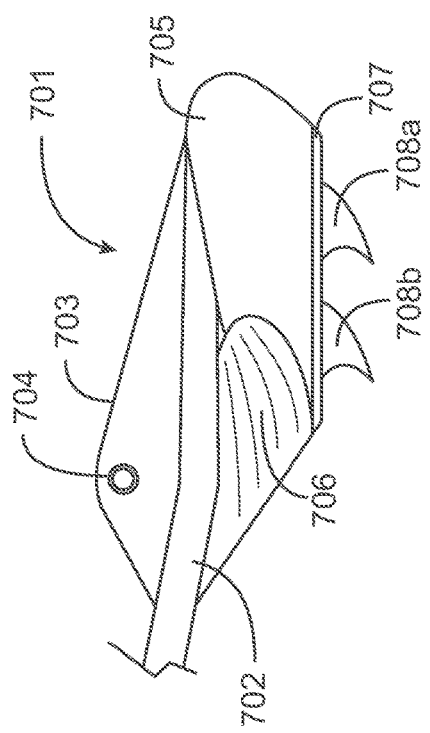
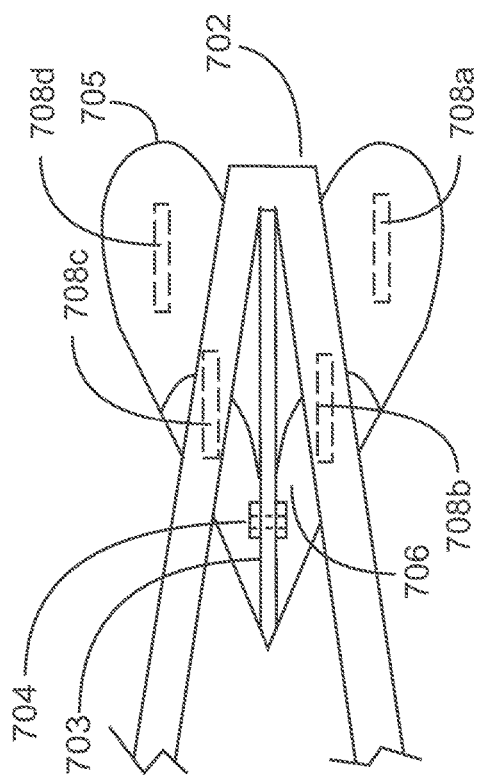

JET SLED

CROSS-REFERENCE TO RELATED DOCUMENTS

This is a Continuation Application of U.S. Ser. No. 17/480,006, filed Sep. 20, 2021, which claims priority under 35 U.S.C. § 119 to provisional application No. 63/145,399, filed Feb. 3, 2021, both of which are herein incorporated by reference in their entirety.

BACKGROUND OF THE INVENTION

Field of the Invention

The present invention is in the technical area of vehicles for human conveyance and pertains more particularly to jet-powered vehicles adapted for operating on land, water, or snow, or ice.

Description of Related Art

Many sorts of human conveyances are known in the art for operating on water, or snow, or ice. Some are powered by engines of various sorts, and some are powered by wind, by sail. The variety of such vehicles is far too great to be listed in entirety here.

Still, in the art there is a lot of room for improvement in the nature of such vehicles, such as, for example, in how the vehicles may be powered, supported and steered. The inventor believes the vehicles taught in the patent application of new and not obvious, and that they fill an unmet need in the art.

BRIEF SUMMARY OF THE INVENTION

In an embodiment of the invention a jet-powered sled is provided, comprising a body having a control cockpit with control apparatus for an operator to control the jet sled, a set of surface runners adapted to engage a surface upon which the sled is operated, the surface runners removably engaged to spindles coupled to suspension apparatus coupled to the jet sled, and an engine compartment having a jet engine removably mounted in a manner to direct thrust to a rear of the jet sled to propel the jet sled forward. The jet sled is characterized in that the sled may be adapted specifically to run on water, ice, or snow by installing runners adapted for water, ice, or snow on the spindles of the suspension apparatus.

In one embodiment the jet sled further comprises braking apparatus extending to the rear of the jet sled, the braking apparatus having an interface for contacting the surface and linkage adapted for lifting the interface from the surface and lowering the interface to contact the surface and provide braking force opposite travel direction of the sled. Also, in one embodiment, the surface runners are ice blades adapted specifically for running on ice, and the interface of the braking apparatus comprises a matrix of downwardly extending blades that engage and cut into the ice surface as the interface is lowered to the surface. In one embodiment the surface runners are water runners each having a partly planer horizontal surface for interfacing with a water surface and a longitudinal vertically oriented bottom fin for slicing into the water surface and providing lateral stability. The braking apparatus comprises a scoop adapted to entrain water, and the interface has internal passages that direct entrained water upwardly and outwardly from one or more exit portals.

In one embodiment the surface runners are snow skis each having a partly planer horizontal surface for interfacing with a snow surf ace, and wherein the braking apparatus comprises a scoop adapted to entrain snow, and the interface has internal passages that direct entrained snow upwardly and outwardly from one or more exit portals.

In one embodiment the engine compartment has a removable carriage frame adapted to mount three jet engines side-by-side. Also, in one embodiment the carriage frame is mounted on rubber vibration-damping supports, and the jet engines are individually removable. In one embodiment the jet sled comprises a single thrust port through which jet thrust is directed, and a plurality of individual planar vanes in the port oriented each with the plane of the vane vertical and pivoted on a forward edge, with the vanes connected by remotely operable linkage such that the vanes may be rotated in concert, directing jet thrust through the port to either side, providing guiding thrust to the jet sled. The linkage connecting the vanes may be operated manually from the control cockpit or may be operated by one or more air or hydraulic cylinders operated from the control cockpit.

In one embodiment the jet sled further comprises a framework constructed from cylindrical metal tubes. There may be metal panels welded over the framework of cylindrical metal tubes. There also may be a polymer foam layered over a roll cage joined to the metal panels, the foam layer shaped and sanded to a body final shape. There may be a final layer of fiberglass applied with thermosetting resin and finished to a final shape and texture.

In another aspect of the invention a method adapting a jet sled for use on a specific surface is provided, comprising assembling runners adapted for the specific surface on spindles coupled to suspension apparatus on the jet sled, and engaging a brake interface adapted to the specific surface to brake manipulation apparatus coupled to the jet sled.

In one embodiment the method further comprises engaging one or more jet engines into a carriage frame and engaging the carriage frame into an engine compartment of the jet sled. In one embodiment of the method the specific surface is water, and the runners are water runners each having a partly planer horizontal surface for interfacing with a water surface and a longitudinal vertically oriented bottom fin for slicing into the water surface and providing lateral stability. In one embodiment the specific surface is snow, and the runners are snow skis each having a partly planer horizontal surface for interfacing with a snow surf ace. And in one embodiment the specific surface is ice, and the runners are ice blades adapted specifically for running on ice.

BRIEF DESCRIPTION OF THE SEVERAL VIEWS OF THE DRAWINGS

FIG. 7A is a side elevation view of a brake mechanism in an embodiment of the present invention.

FIG. 7B is a plan view of the brake mechanism of FIG. 7A.

DETAILED DESCRIPTION OF THE INVENTION

Figure 1A:
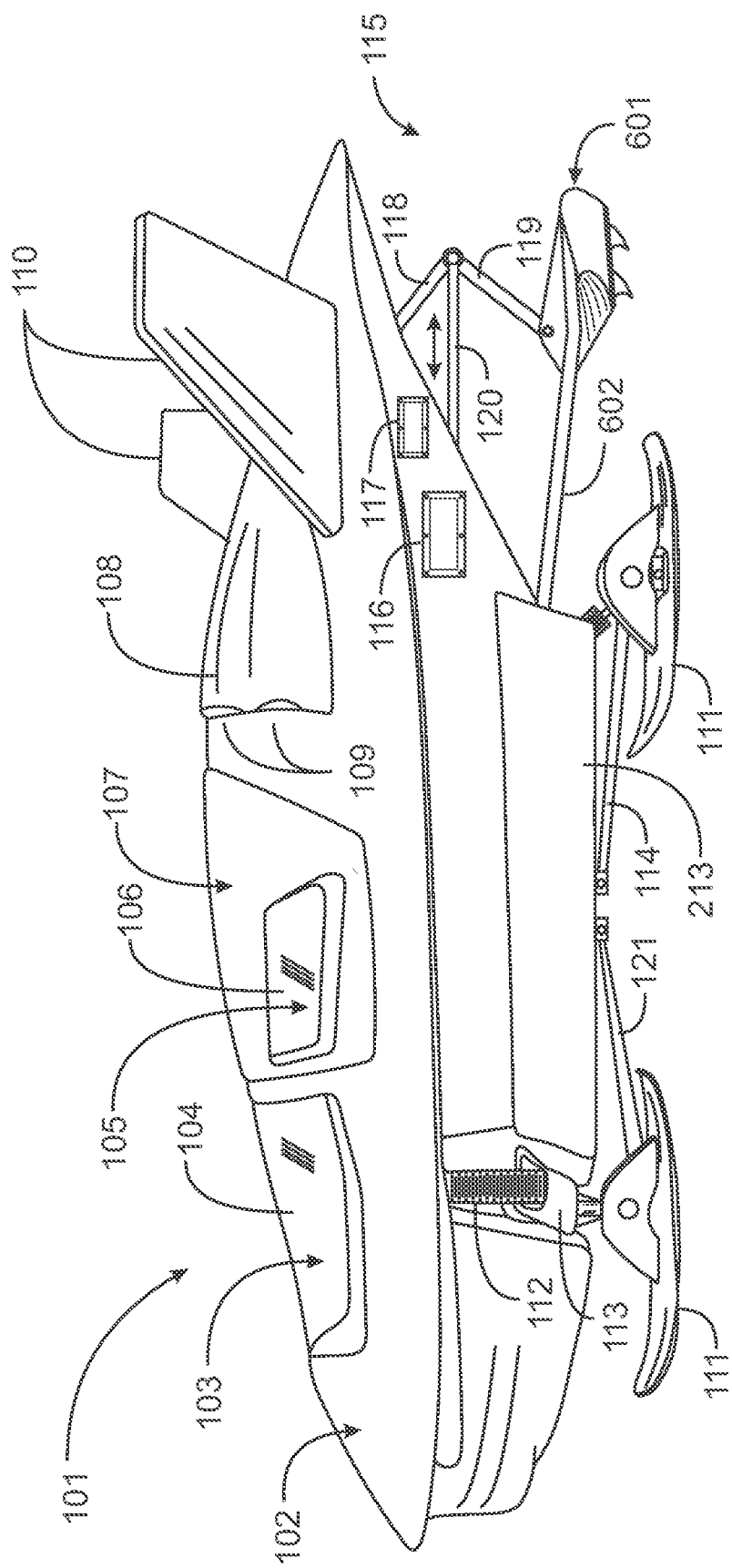
FIG. 1A is an elevation view of a jet sled according to one embodiment of the present invention.

FIG. 1A is an elevation view of a jet sled 101 according to one embodiment of the present invention. In this embodiment the jet sled is powered by one or more jet engines, has enclosed pilot and passenger compartments, and rides on exchangeable runners that may be specific for land, water, for ice or for snow. Sled 101 has a body 102 composed of a plurality of panels which, in one embodiment are reinforced molded polymer panels according to a proprietary fabrication described further in enabling detail below.

The body 102 of jet sled 101, in this implementation, are two cockpit areas, a forward cockpit 103 having a transparent cover 104, which may be in one embodiment plexiglass, and a rear cockpit 105 also having a cover 107. The rear cockpit in this embodiment has side windows 106. In one embodiment cover 107 may be released and either tipped up or removed to provide access to the cockpit. In one embodiment transparent cover 104 may also be released and tipped or removed for access to the front cockpit. In one embodiment front cockpit 103 comprises power and steering controls for a pilot to operate the jet sled. In this embodiment the rear cockpit may be a passenger compartment.

Behind the rear compartment in this implementation there is a cowling 108 covering one or more jet engines providing exhaust out a rear opening (not shown in FIG. 1) to propel the sled. Air inlets 109 to the engines are formed in front of cowling 108. In an embodiment of the engine there are three jet engines propelling the jet sled, and there is a separate inlet 109 for each of the three engines. In one embodiment there are two access covers 116 and 117 implemented through the outer shell of the body of the jet sled. Access cover 116 provides access to fuel pumps for each of the jet engines, for repair and maintenance purposes, Access cover 117 provides access to electronics associated with the jet sled. Both access covers in one embodiment are transparent plates secured with conventional fasteners to the outer shell of the jet sled. There are two aerodynamic fins 110 on a rear portion of the body of the jet sled in this embodiment, which provided stability at high speed.

Figure 1B:
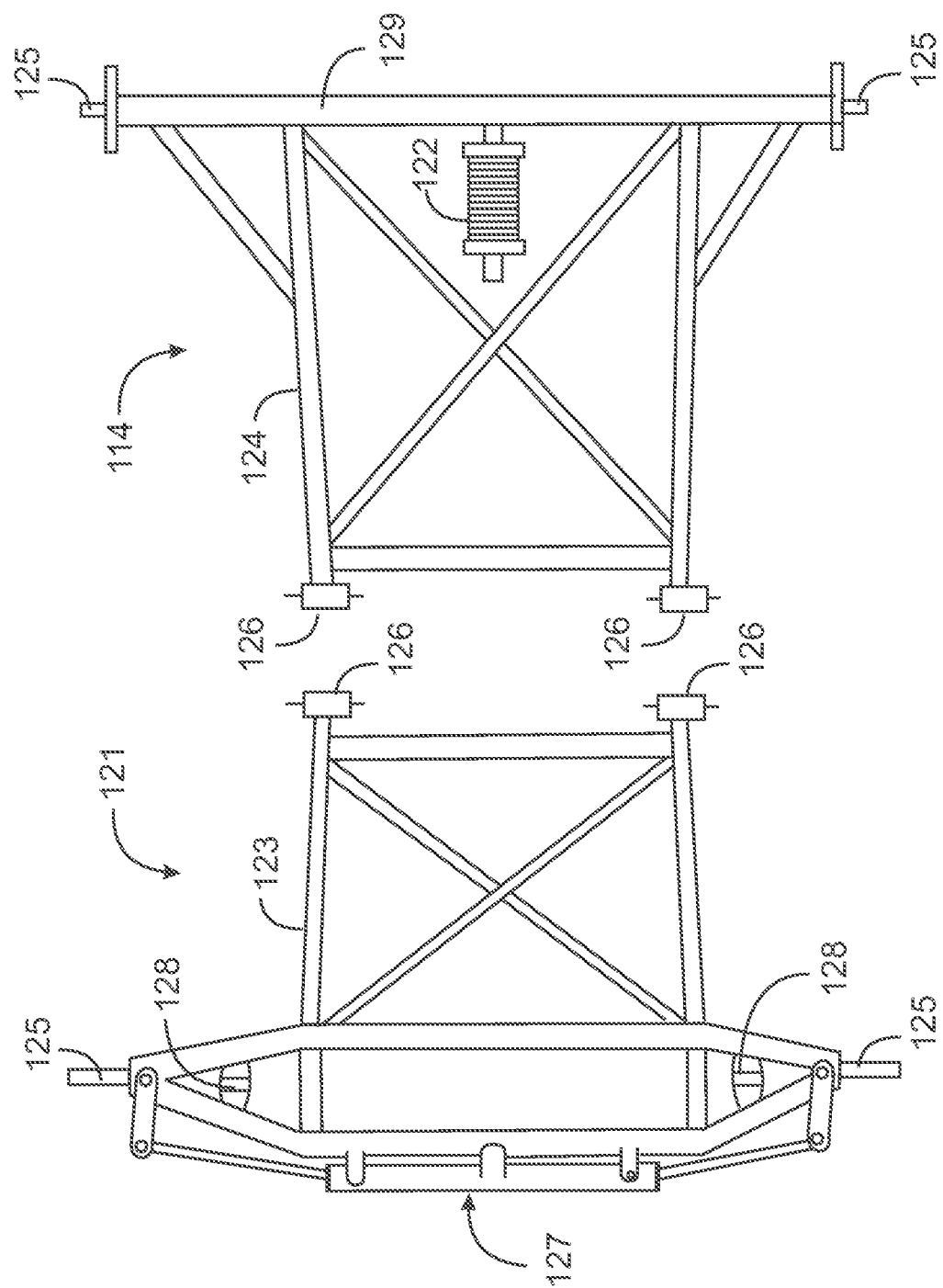
FIG. 1B is a plan view of swing arm assemblies in an embodiment of the invention.

Runners 111 are mounted to shafts on lateral ends of a forward swing arm assembly 121 and a rearward swing arm assembly 114. Detail of forward and rearward swing arm assemblies and mechanisms is shown in FIG. 1B. Runners 111 shown in FIG. 1 are specifically for operation on snow surfaces. Runners for snow operation may be smooth on the undersurface and may have a relatively large surface area in contact with a snow surface. In some circumstances snow runners may have one or more lengthwise grooves or blades to provide an enhanced engagement with the snow surface.

The mounting mechanism provides shock absorbing for the sled. In one embodiment the front runners may be rotated somewhat in a horizontal plane by steering mechanisms (not shown) implemented in the forward cockpit to provide directional steering for the jet sled.

A brake mechanism 115 is operable by a user to engage the snow surface to slow and stop the sled. Mechanism 115 has a braking interface structure 601 further described below with reference to FIGS. 1A, 3 and 4, and the interface is a multiple use interface structure that is operable for snow, ice, or water. In one embodiment a pivoted linkage of links 118 and 119 is opened and closed by moving link 120 horizontally, lowering and raising the brake interface 601.

In FIG. 1A a lower wing 213 is shown on one side of the jet sled body, and there is a mirror image lower wing on the opposite side (not seen) of the jet sled. This wing is further illustrated and described below.

FIG. 1B is a plan view of forward swing arm assembly 121 and rearward swing arm assembly 114. Rearward assembly 114 has a welded frame 124 and shafts for mounting runners 11 at opposite ends of a transverse portion 129 of the frame. The swing arm frame has pivot elements 126 that provide for mounting the swing arm assembly to the frame of the jet sled as may seen in FIG. 1A, constrained by shock and spring element 122 between the swing arm and the body of the jet sled.

Forward swing arm assembly 121 has a frame 123 and shafts 125 at opposite ends of a triangulated structure at a forward end of the frame. Shocks and springs engage mounts 128 attached to the frame. A rack and pinion steering mechanism 127 driving linkages is mounted to a forward end of the frame and is operated from the cockpit of the jet sled. The forward swing arm assembly 121 mounts to the body of the jet sled as seen in Fig. IA.

In development of the jet sled, it was found that there needed to be a difference in height and surface clearance between a jet sled configured to operate on an ice surface and one configured to operate on a soft snow surface. Accordingly, two different forms of swing arm assemblies have been developed.

Figure 1C:
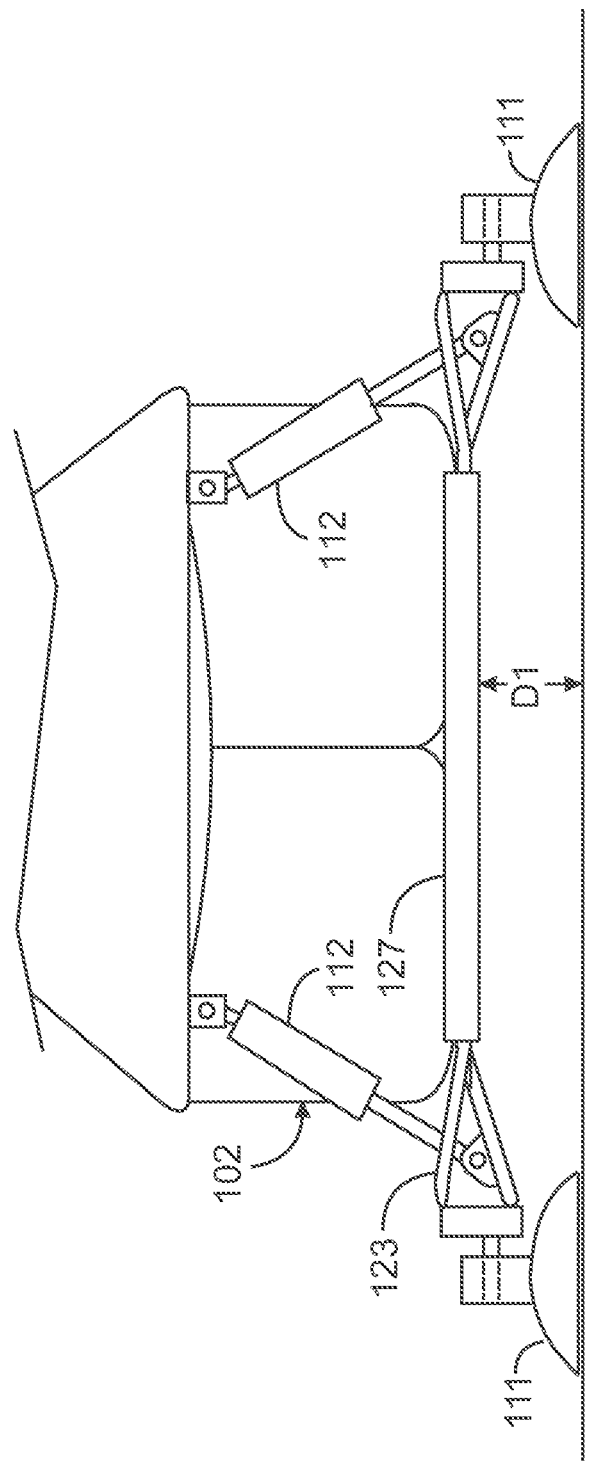
FIG. 1C is a front elevation view of a sled with swing arms for use on ice in an embodiment of the invention.

FIG. 1C illustrates a forward swing arm assembly from a front view for operation on an ice surface, that may also be suitable for operation on water. Swing arm frame 123 is shown with runners 111 mounted, with spring and shock units 112 mounted between the swing arm frame and body 102 of the jet sled. Rack and pinion steering unit 127 is shown as well. In this configuration the front of the swing arm frame is essentially horizontal side to side, and there is a clearance D1 to the ice surface.

Figure 1D:
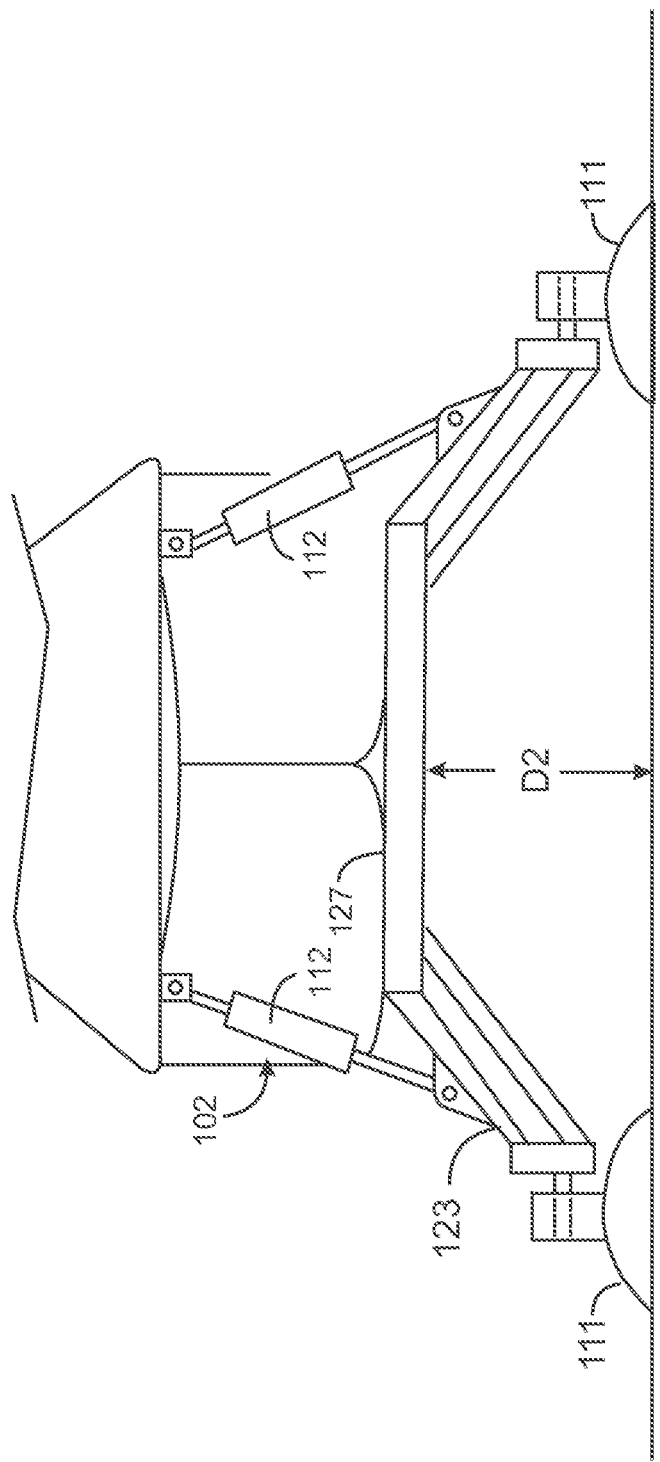
FIG. 1D is a front view of a sled with swing arms for use in deep snow in an embodiment of the invention.

FIG. 1D illustrates a forward swing arm assembly adapted for use in deep snow. The defining difference is that the swing arm frame is constructed to form an arch, such that the clearance D2 from the frame in the center to the level of the runners is substantially greater than D1 for the case of operation on ice.

Figure 2:
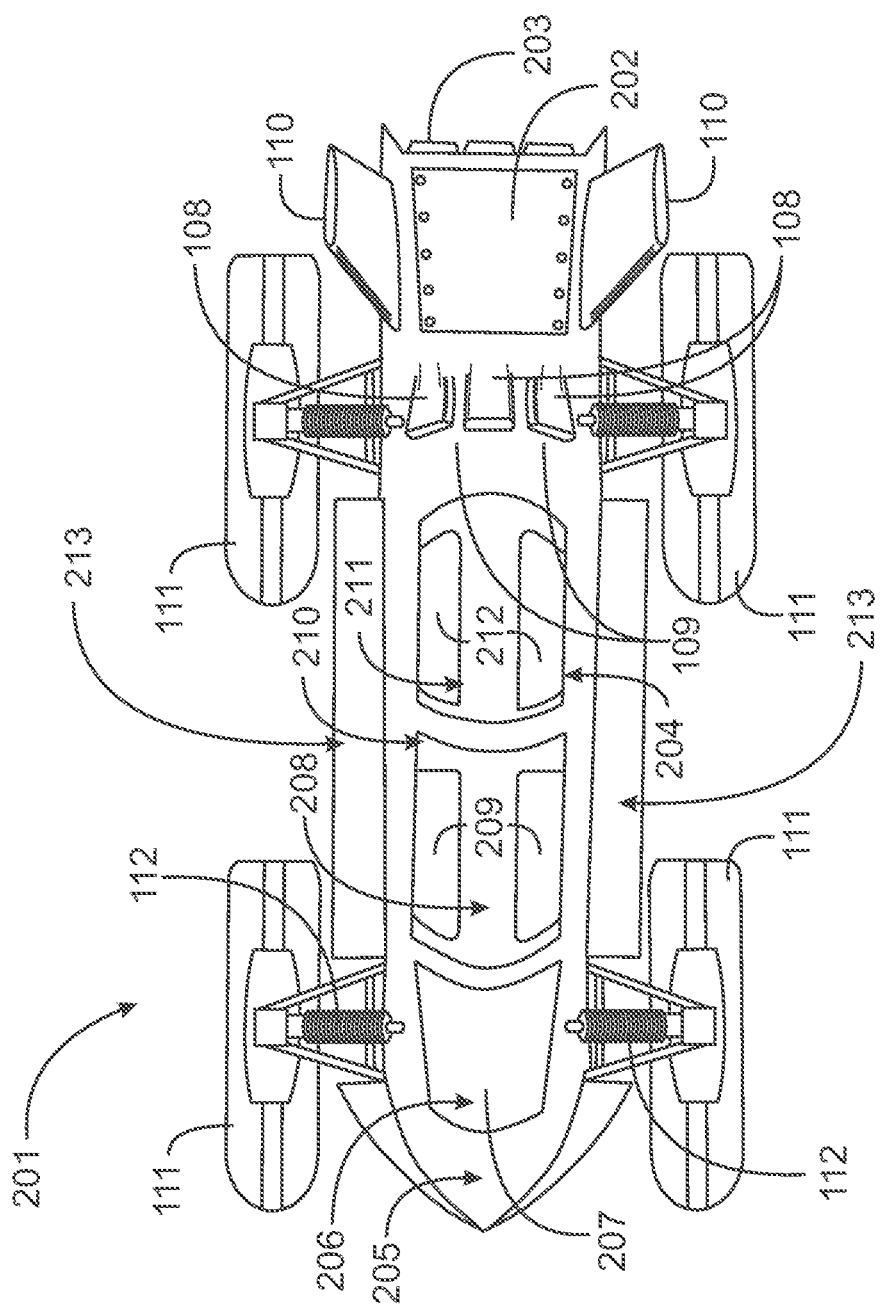
FIG. 2 is a plan view from above of a jet sled in an embodiment of the invention.

FIG. 2 is a plan view from above of a jet sled 201 in an embodiment of the invention. Jet sled 201 is quite similar to jet sled 101 in FIG. 1, differing primarily in number of compartments and windows. Common elements between the two jet sleds bear the same element numbers, and different elements bear different numbers.

Jet sled 201 has a body 205 composed of a plurality of panels which, in one embodiment are reinforced molded polymer panels according to a proprietary fabrication described further in enabling detail below, just as described above for body 102 of jet sled 101. Some shapes and dimensions may be different for the bodies of sleds 101 and 204. Jet sled 201 has a forward cockpit 206 having a transparent cover 207, which may be in one embodiment plexiglass and may be removable.

Jet sled 201 in this example may be longer than jet sled 101 and has an extra compartment. There is a middle compartment 210 that has a removable cover 208 and windows 209. There is in addition a rear cockpit 204 having a removable cover 211 and windows 212. The suspension apparatus and the swing arms are the same as in Figs. IA and IB, with compression springs 112. Jet sled 201 has cowlings 108 with air inlets 109 for air to the jet engines just as in jet sled IO1. Fins 110 are like those for sled IOI of FIG. 1. A cover 202 provides access to engines in the rear of the sled and vanes 203 provide deviation of thrust for directional control. Lower wings 213 are indicated on the jet sled in FIG. 2.

Figure 3:
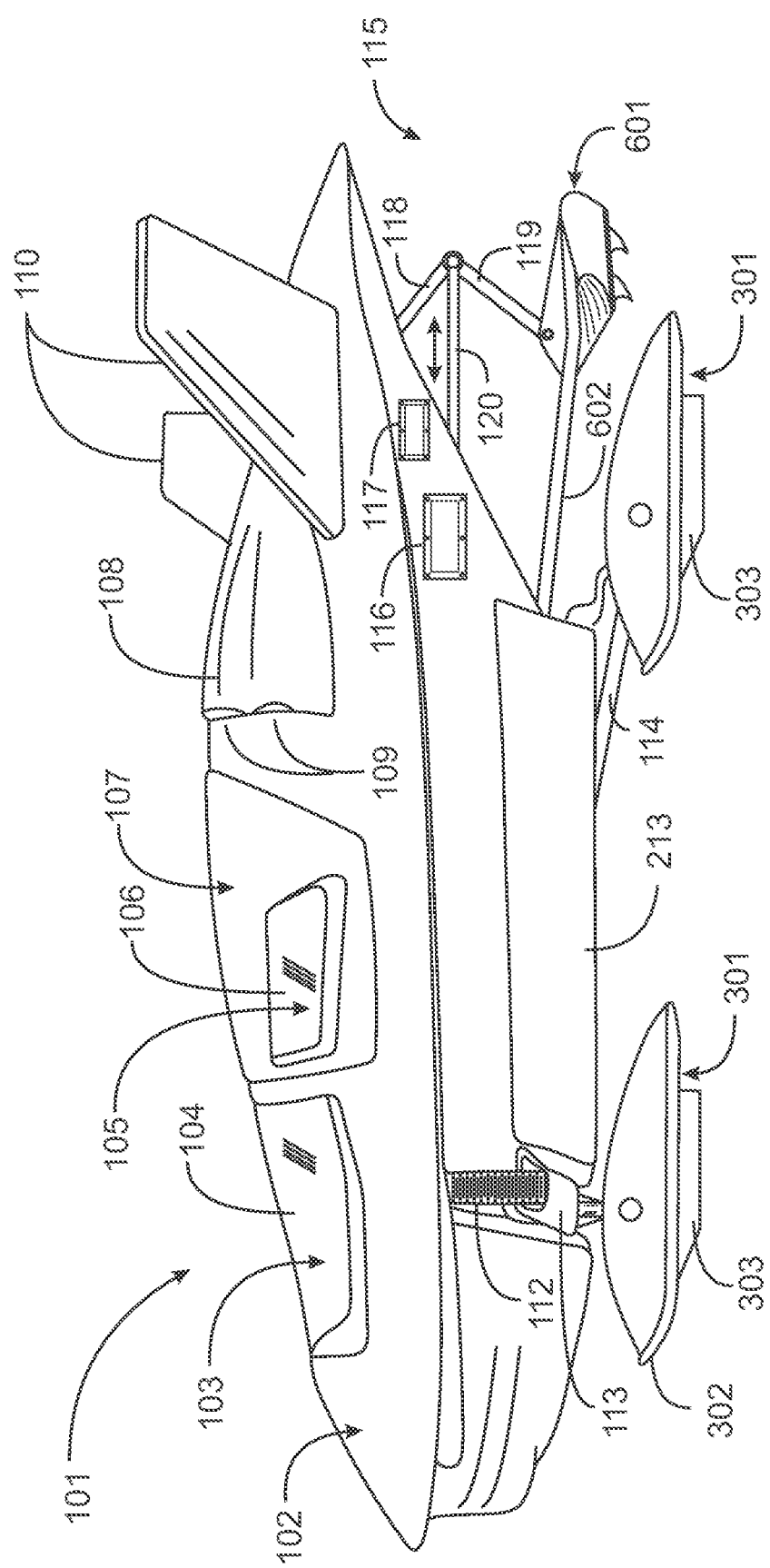
FIG. 3 is an elevation view of the jet sled of FIG. 1 with water runners in an embodiment of the invention.

FIG. 3 is a side view of a jet sled 301 similar to jet sled IOI of FIG. 1 but adapted for operation on water. The adaptation is by switching the snow runners 111 for water runners 301. Water runners 301 may be hollow, or injected with foam and watertight for flotation ability, have a turned up front shape 302 and have a longitudinal bottom fin 303 that cuts into the water and provides stabilization for the jet sled. In some embodiments there may be more than one bottom fin 303. The other three runners are the same. A brake mechanism 115 is operable by a user, just as shown in FIG. 1, to engage the water surface to slow and stop the sled. Mechanism 115 has a braking interface structure 601 further described below with reference to FIGS. 6A and 6B, and the interface is a multiple use interface structure that is operable for snow, ice, or water. Operation of the brake is as described above with reference to FIG. 1. Lower wing 213 is seen in FIG. 3 as well.

Figure 4:
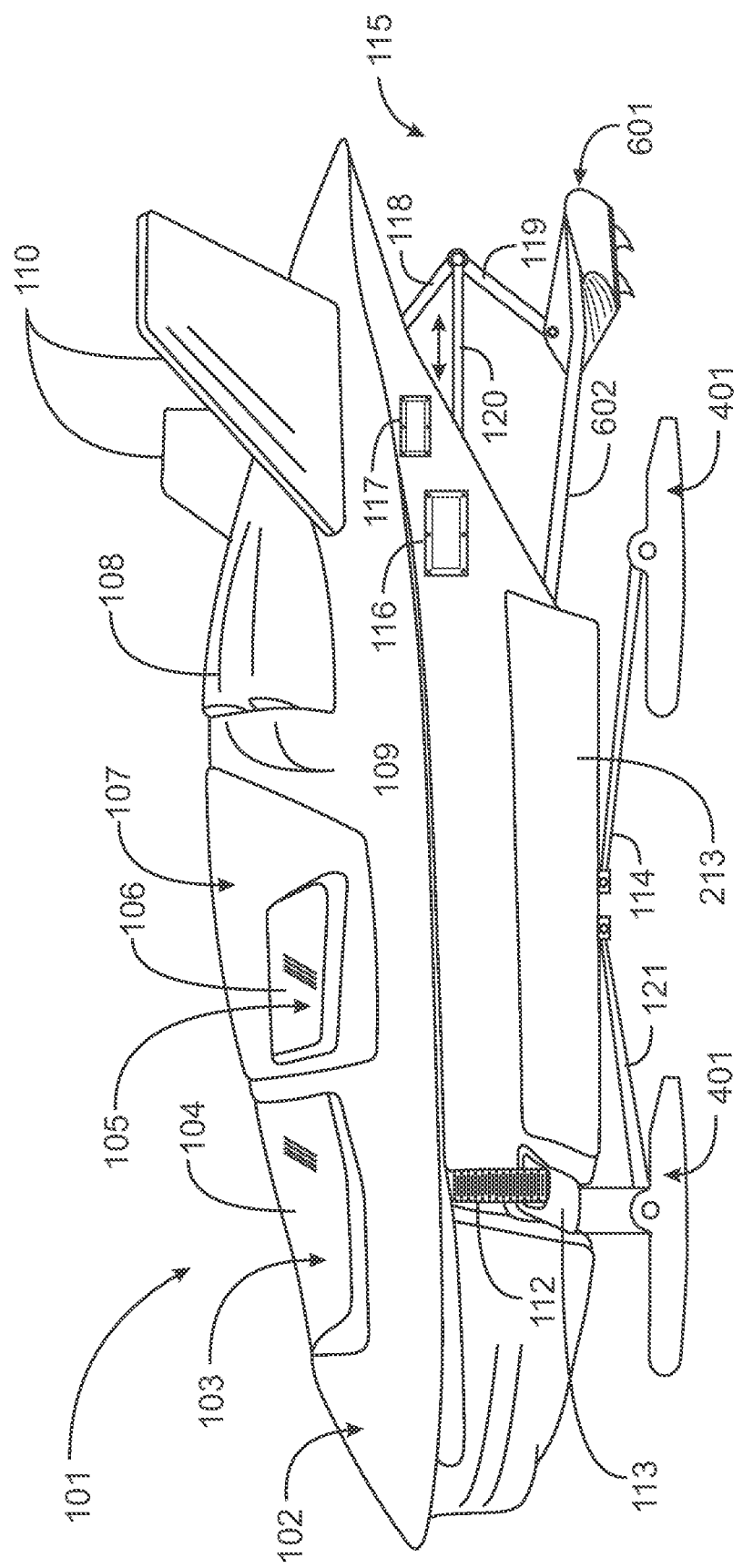
FIG. 4 is an elevation view of the jet sled of FIG. 1 with ice blades for runners in an embodiment of the invention.

FIG. 4 is an elevation view of the jet sled of FIG. 1 with ice blade runners 401 affixed to the suspension members, adapting the sled to be operated on ice. Ice blade runners 401 are implemented to a shape common for ice boats and ice skates, to take advantage of proven technology. A brake mechanism 115 is operable by a user, just as shown in FIGS. 1 and 3, to engage the surface to slow and stop the sled. Mechanism 115 has a braking interface structure 701 further described below with reference to FIGS. 7A and 7B, and the interface is a multiple use interface structure that is operable for snow, ice, or water. Lower wing 213 is seen in FIG. 4 as well.

Figure 5A:
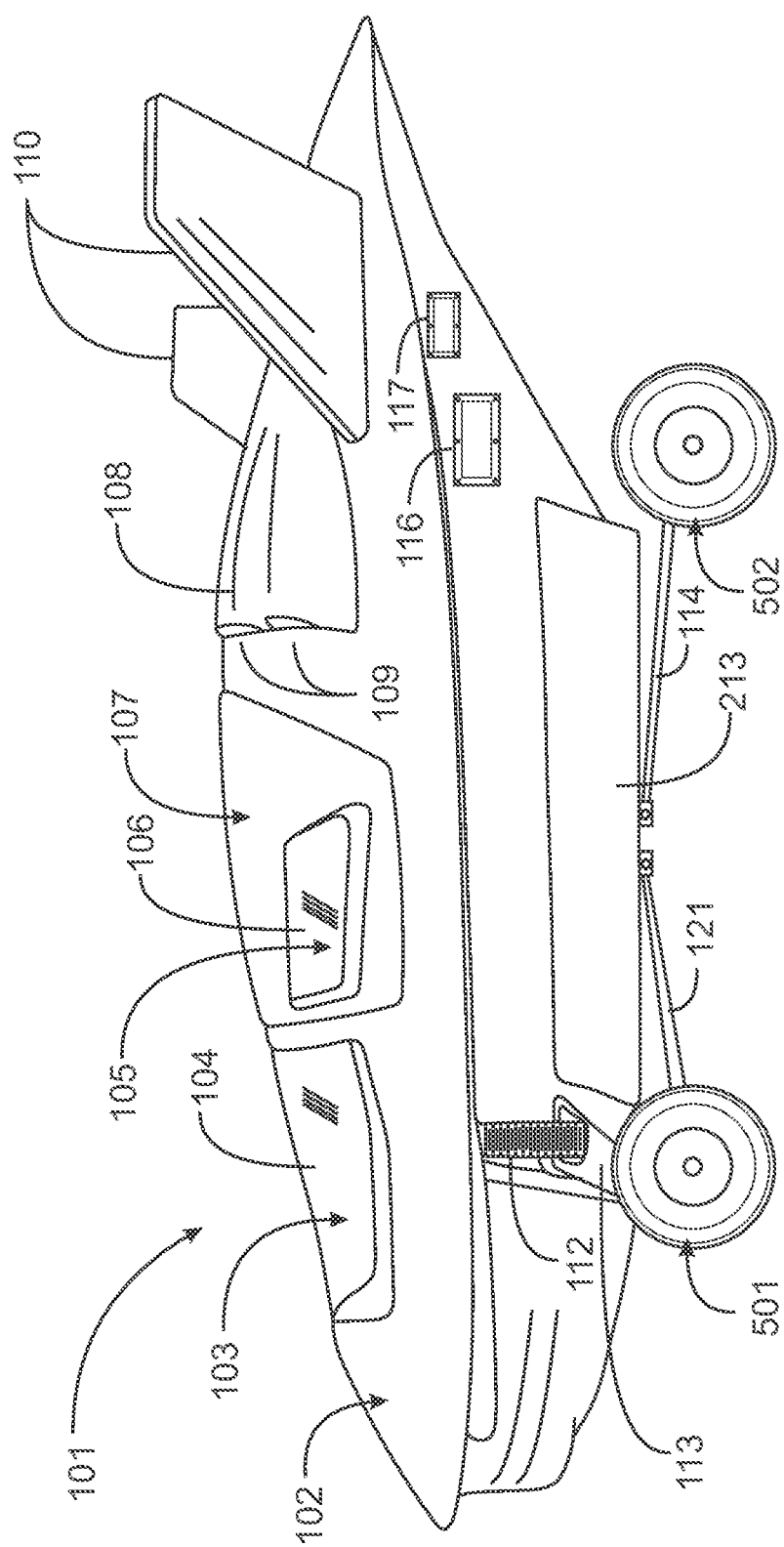
FIG. 5A is an elevation view of a jet sled in an embodiment of the invention that has wheels.

FIG. 5A is an elevation view of the jet sled of Fig. I with wheels 501 and 502 fitted to the axle shafts of the swing arm assemblies 114 and 121 in place of the sled runners illustrated in previous views. In this embodiment, configured to run on a variety of surfaces, such as paved roadways, gravel, sand, dirt and other common surfaces, a variety of wheels may be provided. For example, for a jet sled configures to operate on a soil surface, such as with grass of other vegetation on the surface, wheels 501 and 502 may be of relatively large diameter, and may be pneumatic, that is, air filled. The width of the wheels, not shown, may also be relatively wide. For operation on paved surface the wheels may be of a somewhat smaller diameter and may be harder rather than relatively soft. Different wheels may also have different tread patterns. The size and nature of the wheels is determined by the nature of the surface upon which the wheels are meant to operate.

The drag brake mechanism 115 shown in FIG. 4 is not used on the jet sled with wheels. Instead, the wheels have more conventional disk or drum brakes as are known in the art, which are hydraulically operated and controlled by mechanisms in the cockpit. Lower wings 213 are illustrated in FIG. 5A as well.

Figure 5B:
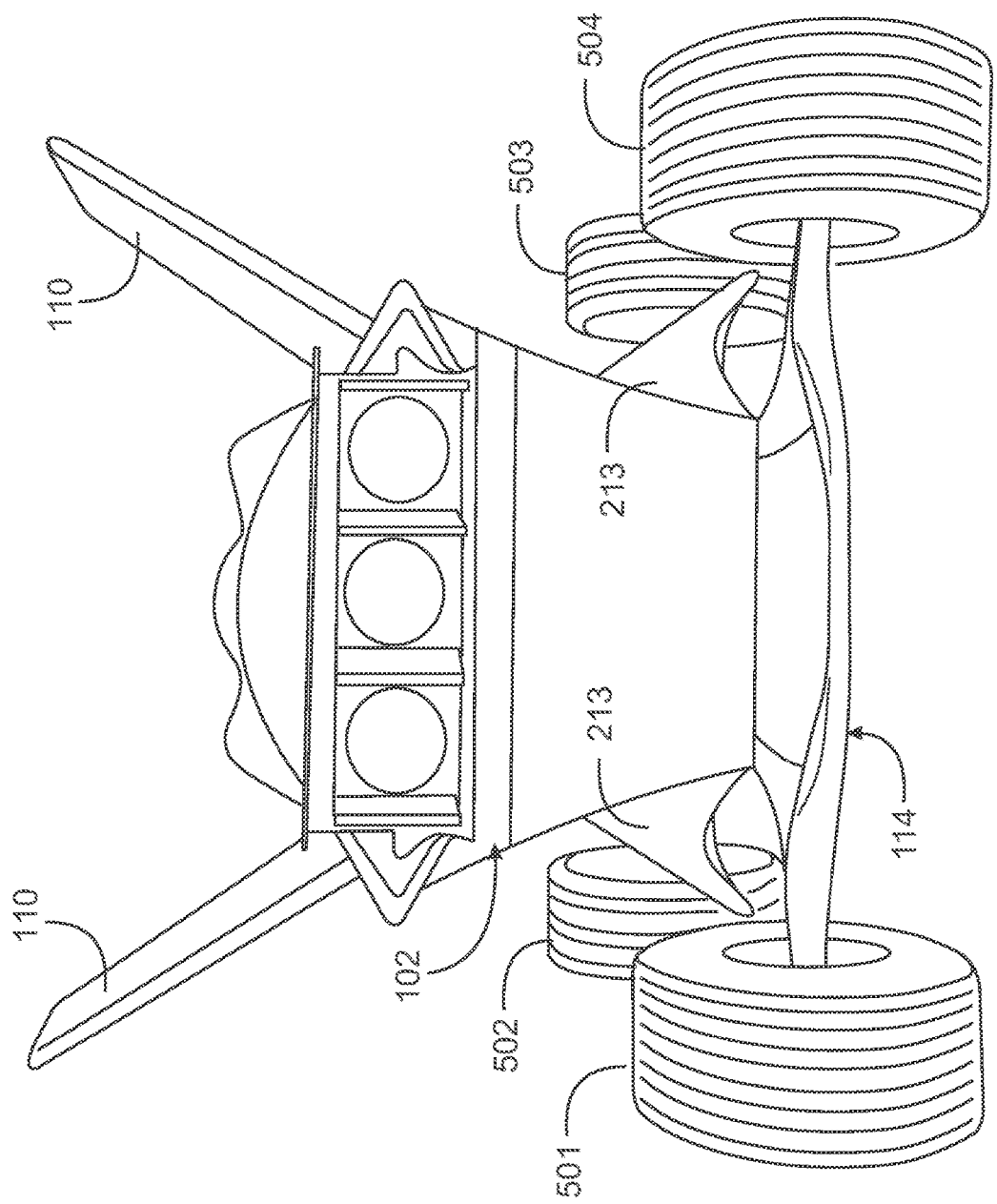
FIG. 5B is a rear end view of the jet sled with wheels of FIG. 5A

FIG. 5B is a rear elevation view of the jet sled with wheels of FIG. 5A. All four wheels 501 through 504 are seen in FIG. 5B and lower wings 213 on each side are illustrated as well. An important purpose of the lower wings is to provide downward force at speed on the jet sled to improve traction on whatever surface the jet sled engages.

Figure 6A:
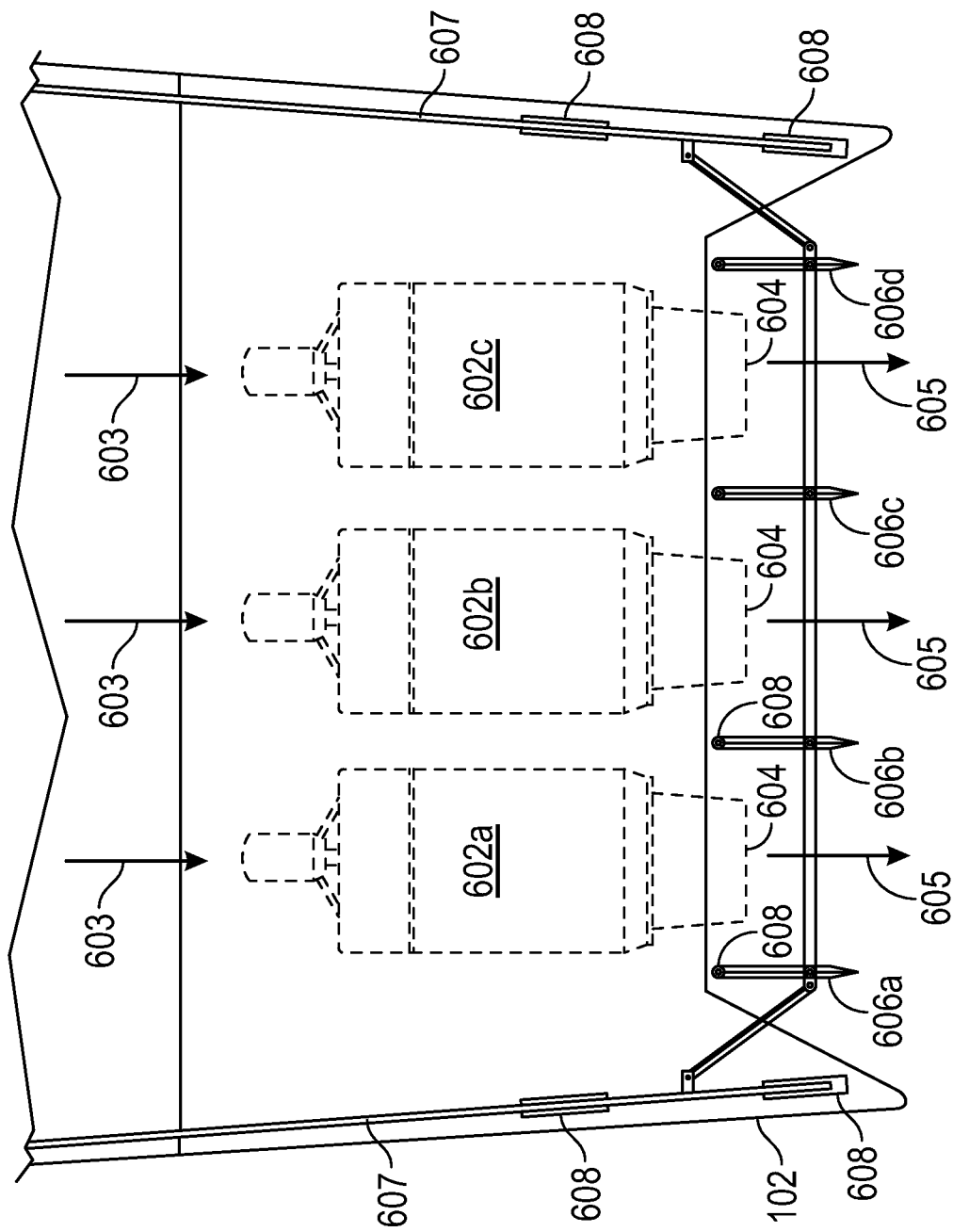
FIG. 6A is a plan view of a portion of a jet sled illustrating jet engines and control linkages in an embodiment of the invention.

FIG. 6A is a plan view of a rear portion of the jet sled with upper structure cut away so interior control elements may be illustrated. Outline 102 in FIG. 6A represents the outside of body 102 (see FIG. 1). The rear portion comprises an engine compartment housing. In this example, three relatively small jet engines 602a, 602b and 602c, which in one embodiment may be King Tee K-320 engines, but may, in other embodiments be engines of a different manufacturer, are mounted to exhaust through vanes in the rear of the jet sled. The engines are shown in dotted outline to illustrate position relative to other elements.

Arrows 603 represent air incoming to the inlets of the jet engines from air inlets 109 (see FIG. 6A). As is known for jet engines fuel is added to the incoming air inside the engines and ignited, the expansion creating exhaust through funnels 604, represented by arrows 605, creating thrust to propel the jet sled.

In the embodiment illustrated in FIG. 6A exhaust from the jet engines is directed through a set of vanes 606a through 606c, which are connected by linkages operated by slide rods 607 through plastic bearing guides 608. The operating linkages 607 are manipulated by mechanical mechanisms in the pilot compartment 103 (see FIG. 1). A pilot in control of the jet sled may guide the sled though controls that turn front runners in a horizontal plane, as well as by manipulating vanes 606a through 606d to change thrust direction near the rear of the sled. Vanes 606a-606c are of a size that effectively direct jet engine output. Vanes 606a-c may have a height and width equal to or greater that a height and width of the jet engines, in some embodiments, up to twice a height and width of the jet engines 502a-c.

Each engine of the three illustrated in FIG. 6A is capable of about 70 pounds thrust, so the three together may generate a thrust of well over 200 pounds at full throttle. The jet sled on water, snow or ice has little friction, so considerable velocity may be attained, and with the mass of the sled, considerable momentum. So efficient braking is essential. Referring to FIGS. 1, 3 and 4, a brake mechanism 115 is illustrated for those implementations with runners and not wheels, which may be lowered by control input in the pilot compartment to engage the running surface to provide braking friction. The interface of the brake mechanism may be the same for water, snow, or ice. For a jet sled according to an embodiment adapted to run on a water surface the brake interface is implemented to scoop water and eject same up and out at an angle of about forty-five degrees, creating back thrust for braking.

The brake interface for a jet sled in an embodiment of the invention adapted to run on snow is the same as that for water, in that the interface scoops snow and ejects the snow up and out at an angle of about forty-five degrees, creating back thrust for braking. For a jet sled adapted to run on ice the brake interface is implemented to dig into the ice from one-quarter to one half inch deep with one-inch cutting blades. The number of blades for the ice sled may vary depending on the weight and power of a particular sled according to an embodiment of the present invention, but in a preferred embodiment there are four blades. It has been found that a larger number of blades impedes ability of the blades to penetrate the ice surface.

Figure 6B:
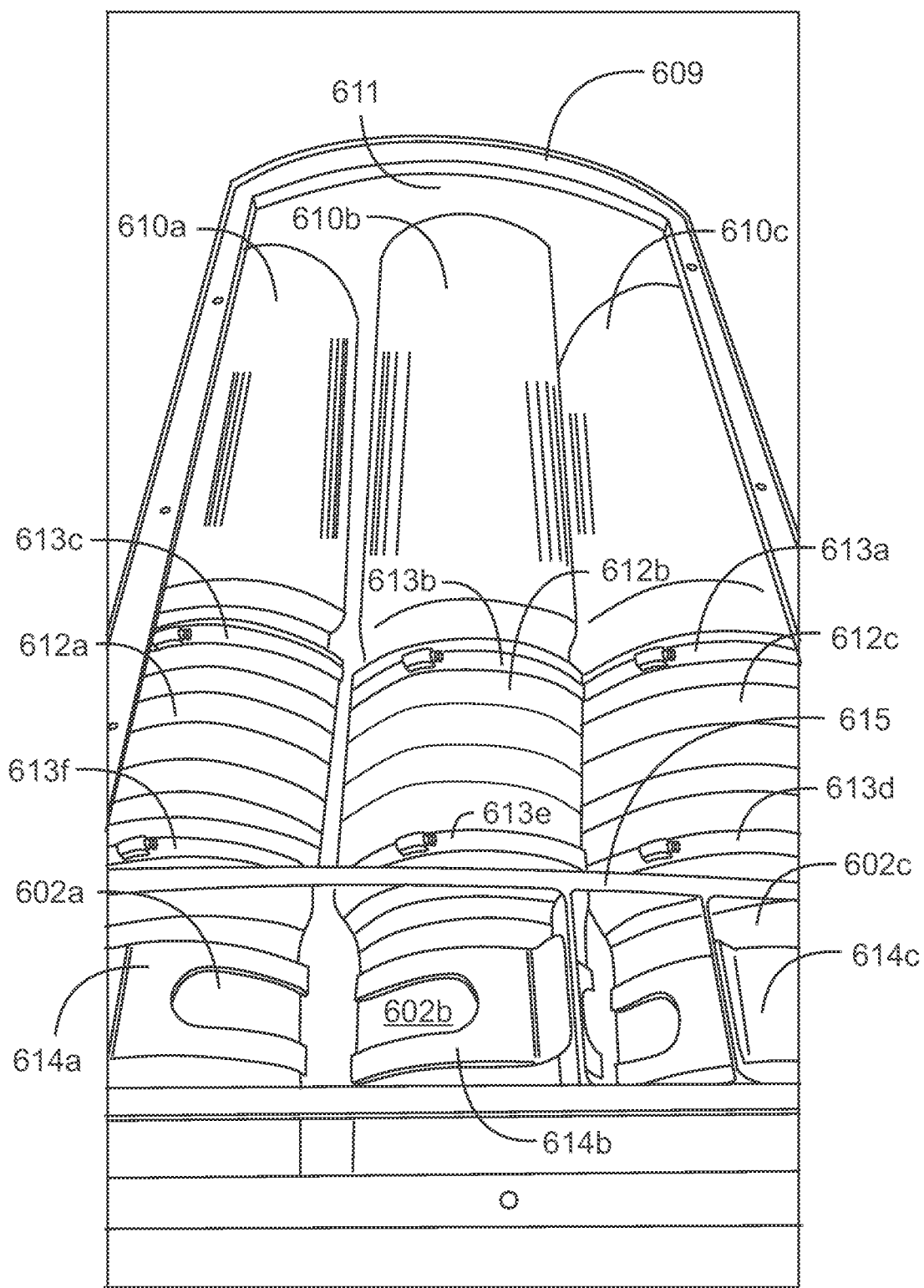
FIG. 6B is a plan view of an engine compartment of the jet sled showing air conduits and connections in an embodiment of the invention.

FIG. 6B is a plan view of the engine compartment of the jet sled with cover 202 removed, showing engines 602a, 602b and 602c mounted in a frame 615, and elements that conduct air to the engines. Three tubes 610a, 610b and 610c interface with a panel 611, and receive air from the air inlets 109 as may be seen in FIGS. 1, 3 and 4. Engines 602a, 602b and 602c are joined to tubes 610a, 610b and 610c respectively by flexible conduits 612a, 612b and 612c. The flexible conduits are clamped to the tubes and the engines by clamps 613a, 613b, 613c, 613d, 613e and 613f. Thus, a separate enclosed path for air to each engine is provided.

In a preferred embodiment tubes 610a, 610b and 610c and flexible conduits 612a, 612b and 612c are made of aluminum or stainless steel to resist heat produced by the engines. In some embodiments the tubes may be polymer tubes and the flexible conduits may be rubber or synthetic rubber. The flexible conduits may be clamped or friction fitted to the tubes.

FIG. 7A is an elevation view of a brake apparatus 701 for the jet sled in those embodiments for which a drag brake is indicated. Apparatus 701 is adaptable for use with water, ice or snow. Apparatus 701 comprises in this example cantilever arm 702 extending to the rear of the jet sled and attached by a pivot mechanism to the body of the jet sled, so the brake apparatus may be raised and lowered. Apparatus 701 has a vertically oriented plate 703 with a pivot opening 704 that is joined to operating linkages as shown in FIGS. 1 and 3. There is a body 705 that supports shaped diverter surfaces 706 that are mirror image on opposite sides of the apparatus. These shaped surfaces with the apparatus immersed in either water or snow, divert streams of water or snow upward and outward at an angle on each side, which creates braking force. A set of teeth 708a, 708b, 708c and 708d are mounted to a lower plate 707. When operating on ice lowering the brake apparatus causes the teeth to dig into the ice surface creating drag for braking.

FIG. 7B is a top plan view of the brake apparatus showing more detail of the central plate 703, the arm 702 and the placement and spacing of the four teeth.

A skilled person will understand that the example illustrated and described with reference to FIGS. 7A and 7B are exemplary, and there may be many variations in different embodiments of brake apparatus in embodiments of the invention.

In operation, when braking is necessary, the operator may back off on jet thrust and engage the brake. In some embodiments the mechanism to operate the brake may be entirely manual, and spring loaded to disengage when pressure is released. In other embodiments the brake may be lowered and engaged, and retracted, by a pneumatic or hydraulic cylinder.

Figure 8:
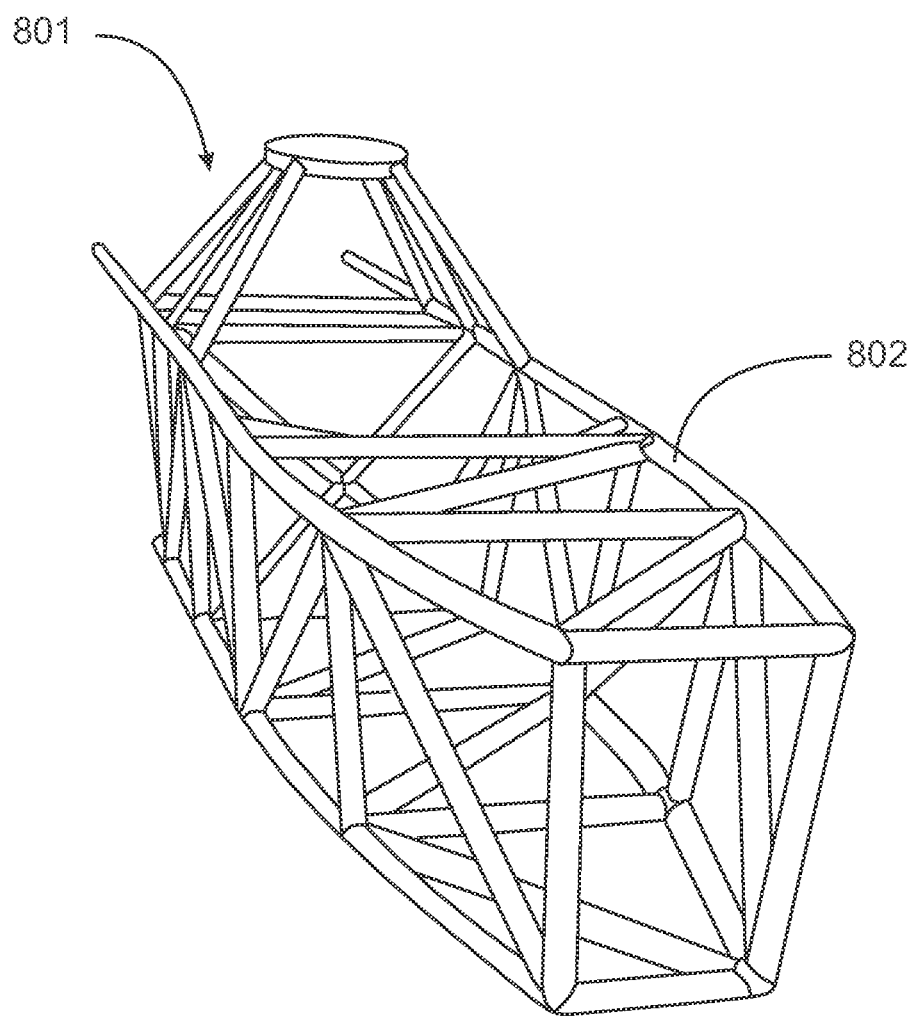
FIG. 8 illustrates a first step in construction of a jet sled according to an embodiment of the present invention.

FIG. 8 illustrates a first step in construction of a jet sled according to an embodiment of the present invention. The base of the jet sled is a frame 801 comprising a plurality of metal tubes 802 formed to shape and welded into the shape for a jet sled body. The tubing in some embodiments is stainless steel, but in other embodiments may be steel, aluminum, titanium, chrome molybdenum, or any of a variety of other materials.

Figure 9:
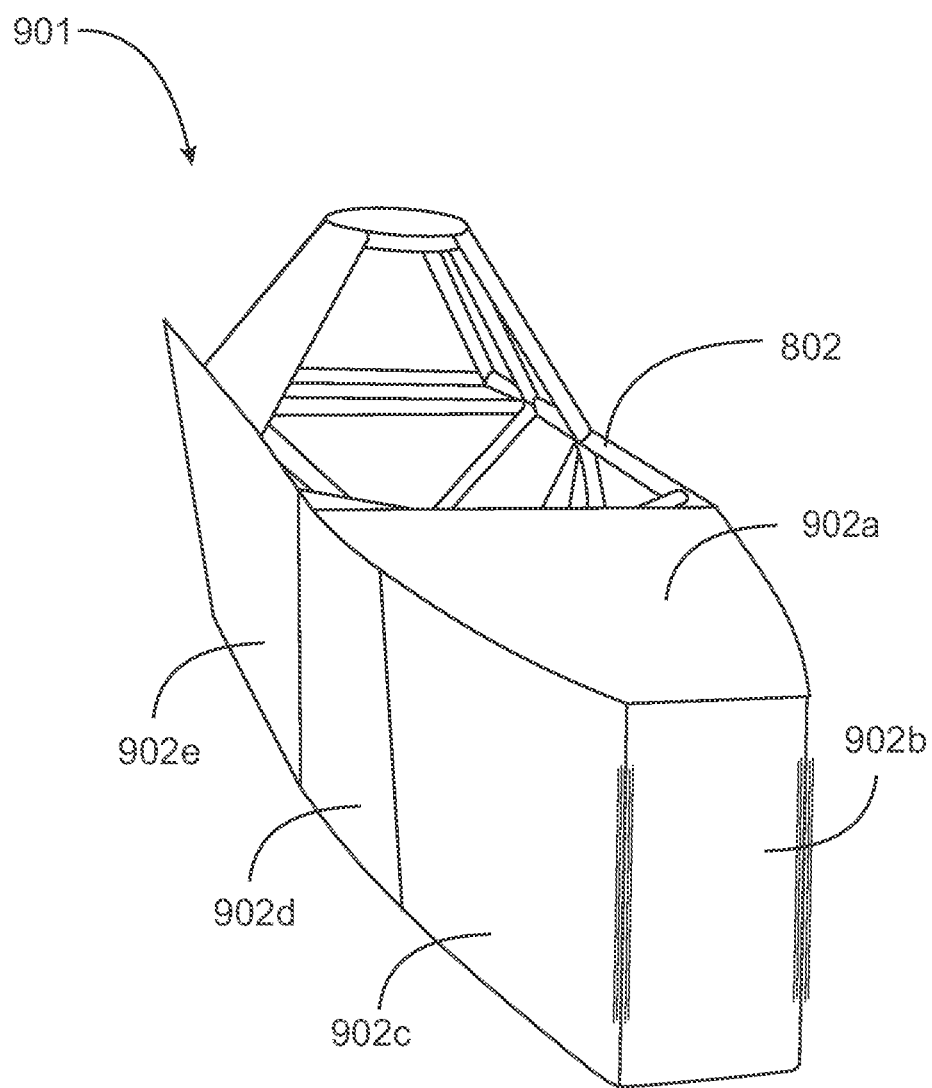
FIG. 9 shows a jet sled body at another step in formation in an embodiment of the invention.

FIG. 9 shows a jet sled body 901 at another step in formation, representing a following step in the formation of the jet sled body according to an embodiment of the present invention. In this view sheet metal panels 802a through 802e, previously cut to shape, are shown riveted or welded over the tubular frame 802 of FIG. 8. In other embodiments other means of joining the panels to the frame may be employed, such as by adhesives, for example. In many implementations mechanical apparatus, such as steering and braking elements and the like, may be assembled to the tubular frame before the sheet metal panels are added.

Once the frame and mechanical apparatus is built and assembled for a jet sled according to an embodiment of the invention it remains to finish the body final shape, as may be seen in FIGS. 1-4, for example. This is done by providing an external roll cage made with high grade aluminum or other suitable material, which may be mesh material. Polyurethane foam is applied over the roll cage, allowed to set, and is then filed and shaped to the final body form. After shaping the foam, a thin layer of body filler is applied, set, and shaped, and then final layers of fiberglass applied with a thermosetting resin. The foam, filler, and fiberglass finish acts as a bonding agent to hold the whole jet sled together. After final sanding and shaping, the body may be painted.

In above descriptions of various figures, a versatile jet sled is revealed, which may be adapted quickly and efficiently to operate on water, on ice, or on snow surfaces. Runners of different sorts are provided adapted for snow, water or ice, and the runners, illustrated in FIGS. 1-4, are assembled to a jet sled on spindles projecting to each side of forward and rear carriage suspension apparatus of a jet sled according to an embodiment of the invention. In most embodiments, runners may be removed by disengaging a nut or a pin and withdrawing the runner from the spindle, and a different runner may be engaged to the spindle and the nut or pin replaced.

In addition to replacing runners, brake mechanisms adapted for water, snow or ice operation may be quickly and efficiently removed and replaced to provide proper braking operation for the surface.

Also, in adaptation of a jet sled for different use jet engines may be removed and replaced as is described above. One may equip a jet sled with one, two or three jet engines, and may remove same singly or in groups for service or repair as may be necessary. Different jet engines may be used having different thrust characteristics in different circumstances.

The inventor of the present invention intentionally designs the novel features of the present jet sled to optimize the machine to traverse different mediums, land, water, ice and snow. Control of the jet sled is an issue as the weight of the jet sled may be within a range of 550-600 lbs with no driver or fuel. With a driver and fuel weights may be within a range of 650-800 lbs. Two jet engines at capacities previously stated, may experience a thrust of 75 lbs and 320 newtons each. Without the novel modifications of the present invention, including body shape, wings, vanes and specific runner elements, blades, ski, wheel etc. the jet sled experienced being air borne, i.e., leaving contact with the ground, ice, water, at 160-165 mph. With the novel modifications adding control and downdraft, the jet sled could reach speeds of 200-250 mph without leaving ground and being considered "air born". At this speed a driver may actually experience a similar feeling of being air born, while maintaining contact with ground, water, ice, or snow.

The skilled artisan will understand that the descriptions above of various embodiments are all exemplary only and

What is claimed:

1. A method of sledding over a variety of surfaces on a sled, comprising:
   mounting a sled body on a first set of swing arms for use on ice and water, and mounting the sled body on a second set of swing arms for use on snow;
   removably installing a jet engine in an engine compartment in the sled body, the engine compartment having a thrust port with angularly adjustable vanes;
   interchangeably mounting onto the sled body one of three sets of runners, including a first set of runners to support the body on ice, a second set of runners to support the body on snow, and a third set of runners to support the body on water;
   interchangeably mounting onto the sled body one of multiple brake assemblies, the brake assemblies having different braking structures from one another and the one brake assembly being chosen depending on the type of surface being sled upon;
   directing thrust from the jet engine through the thrust port to propel the sled forwardly; and then steering the sled by a driver in a cockpit of the sled pivoting the vanes about vertical axes.

2. The method of claim 1 wherein the driver moves the brake assembly between a normally inoperative position disengaged from the surface and an operative position engaging the surface to slow the sled speed.

3. The method of claim 2 wherein the brake assembly is raised to the inoperative position and lowered to the operative position by the driver.

4. The method of claim 2 wherein the one brake assembly is adapted to scoop snow or water, when engaged.

5. The method of claim 4 wherein the one brake assembly ejects the scooped snow or water, respectively to create back thrust to slow the sled.

6. The method of claim 1 wherein the brake assemblies are spring loaded for disengagement.

7. The method of claim 1 wherein the brake assemblies are engaged and disengaged hydraulically or pneumatically.

8. The method of claim 1 further comprising removably installing additional jet engines in the engine compartment to provide additional thrust for the sled.

9. The method of claim 1 wherein the first set of swing arms has a shorter height than the second set of swing arms.

10. The method of claim 1 wherein the runners are mounted at four corners of the sled.

11. A method of modifying a jet sled for use on various surfaces, comprising:
    installing a first set of runners and a first set of brakes for use on ice; and alternatively,
    installing a second set of runners and a second set of brakes for use on snow; and alternatively, installing a third set of runners and the second set of brakes for use on water;
    providing controls for engaging and disengaging the installed sets of brakes to and from the ice, snow, and water, respectively;
    adjusting distance between a body of the sled and the surface by interchanging a first short set of swing arms for a second tall set of swing arms, the swing arms residing between the body and the runners, depending on whether the surface is ice, water, or snow.

12. The method of claim 11 further comprising installing a set of wheels with brakes for use on dry land and roadways.

13. The method of claim 12 further comprising installing at least one jet engine in an engine compartment on the jet sled to provide forward thrust for the jet sled and providing directional vanes in a thrust port of the jet sled to provide guidance for the jet sled; and the vanes being vertically oriented and pivotal to selectively direct thrust from the jet engine to either side of the thrust port.

14. The method of claim 11 wherein the second brakes scoop snow and water and eject the snow and water, respectively, for back thrust when engaged.

15. The method of claim 11 wherein the runners are mounting to opposite lateral ends of the swing arms.

16. The method of claim 11 wherein the first, second and third sets of runners each are mounted at identical locations on the sled.

17. The method of claim 16 wherein the runners are mounted on front and rear opposite lateral sides of the sled.

18. The method of claim 17 wherein the skies mount on opposite ends of arms extending beneath the body of the sled and laterally outwardly from opposite sides of the body of the sled.

* * * * *